(12) United States Patent
Fukai (10) Patent No.: US 12,271,052 B2
(45) Date of Patent: Apr. 8, 2025

(54) LENS BARREL AND OPTICAL APPARATUS

(71) Applicant: CANON KABUSHIKI KAISHA, Tokyo (JP)

(72) Inventor: Yosuke Fukai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 601 days.

(21) Appl. No.: 17/687,852

(22) Filed: Mar. 7, 2022

(65) Prior Publication Data
US 2022/0187565 A1 Jun. 16, 2022

Related U.S. Application Data

(63) Continuation of application No. PCT/JP2020/023688, filed on Jun. 17, 2020.

(51) Int. Cl.
G02B 7/09 (2021.01)
G02B 27/64 (2006.01)

(52) U.S. Cl.
CPC ............. G02B 7/09 (2013.01); G02B 27/646 (2013.01)

(58) Field of Classification Search
CPC ................................ G02B 7/09; G02B 27/646
USPC ........................................................ 359/823
See application file for complete search history.

(56) References Cited

U.S. PATENT DOCUMENTS

2014/0139695 A1* 5/2014 Kawai ...................... G03B 5/00
348/208.99

FOREIGN PATENT DOCUMENTS

| JP | 2013-134326 A | 7/2013 |
| JP | 2014-102343 A | 6/2014 |
| JP | 2016061877 A * | 4/2016 |
| JP | 2017-037254 A | 2/2017 |

OTHER PUBLICATIONS

PCT/IB/338 (PCT Notification of Transmittal of Translation of the International Preliminary Report on Patentability); PCT/IB/373 (PCT International Preliminary Report on Patentability); PCT/ISA/237 (PCT Written Opinion of the International Searching Authority).
International Search Report dated Aug. 25, 2020 of International Application No. PCT/JP2020/023688, which is enclosed.

* cited by examiner

Primary Examiner — Brandi N Thomas
Assistant Examiner — Boutsikaris Leonidas
(74) Attorney, Agent, or Firm — Cowan, Liebowitz & Latman, P.C.

(57) ABSTRACT

A lens barrel includes first and second rack members that movably support the first and second holding members in the optical axis direction, and first and second driving members that drive the first and second holding members. The first and second guide shafts that guide the movement of the first and second holding members and the first and second guide shafts that drive the third holding member in the first and second directions orthogonal to each other in the optical axis direction and orthogonal to each other. It has a two-coil unit and a correction unit including first and second urging members that urge the third holding member in the optical axis direction, and has a first rack member, a first drive member, a first guide shaft, and a correction unit. A predetermined arrangement is satisfied.

10 Claims, 12 Drawing Sheets

LENS BARREL AND OPTICAL APPARATUS

CROSS-REFERENCE TO RELATED APPLICATIONS

This application is a Continuation of international Patent Application No. PCT/JP2020/023688, filed on Jun. 17, 2020, which claims the benefit of Japanese Patent Applications No. 2019-165123, filed on Sep. 11, 2019, which is hereby incorporated by reference herein in their entirety.

BACKGROUND OF THE INVENTION

Field of the Invention

The present invention relates to a lens barrel mounted on an optical apparatus, such as a digital still camera and a digital video camera, and more particularly to a lens barrel including an optical system including a plurality of lens units.

Description of the Related Art

The digital-camera technology has recently been applied to optical apparatuses such as a monocular and a pair of binoculars, and digital cameras having various shapes have been proposed. For example, there is proposed a digital camera, like a video camera, which has a shape that is long in an optical axis direction and has a vertically long shape close to a rectangle when viewed from a front so as to fit a hand of a user. Making small and thinning the lens barrel significantly contribute to the miniaturization of such a digital camera. Japanese Patent Laid-Open No. ("JP") 2013-134326 discloses a retractable lens barrel that houses lens units as close as possible to each other during non-imaging in order to thin the image pickup apparatus.

In the retractable lens barrel illustrated in JP 2013-134326, the lens units become very close to each other during non-imaging, and another component cannot be disposed between them. Thus, a motor and a rack member that drives the motor, for example, are arranged outside an outer shape of a lens holding frame. Therefore, even if the lens barrel can be made thinner in the optical axis direction, it becomes larger in the outer-shape direction.

SUMMARY OF THE INVENTION

The present invention provides a lens barrel and an optical apparatus, each of which can be made small.

A lens barrel according to one aspect of the present invention includes a first rack member configured to movably support a first holding member in an optical axis direction, the first holding member holding a first optical element, a first driving member configured to drive the first holding member via the first rack member, a second rack member configured to movably support a second holding member in the optical axis direction, the second holding member holding a second optical element, a second driving member configured to drive the second holding member via the second rack member, a first guide shaft and a second guide shaft configured to guide movements of the first holding member and the second holding member in the optical axis direction, respectively, and a correction unit that includes a first coil unit configured to drive a third holding member in a first direction orthogonal to the optical axis direction, the third driving member holding a correction element, a second coil unit configured to drive the first holding member in a second direction orthogonal to the optical axis direction and the first direction, and a first urging member and a second urging member configured to urge the third holding member in the optical axis direction. The first rack member, the first driving member, the first guide shaft, and the first urging member are arranged on a first straight line parallel to an axis of symmetry of the first and second coil units when viewed from the optical axis direction. The second rack member, the second driving member, the second guide shaft, and the second urging member are arranged on a second straight line parallel to the axis of symmetry when viewed from the optical axis direction. An optical apparatus including the lens barrel also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

Overall Lens Barrel Configuration

Figure 1:
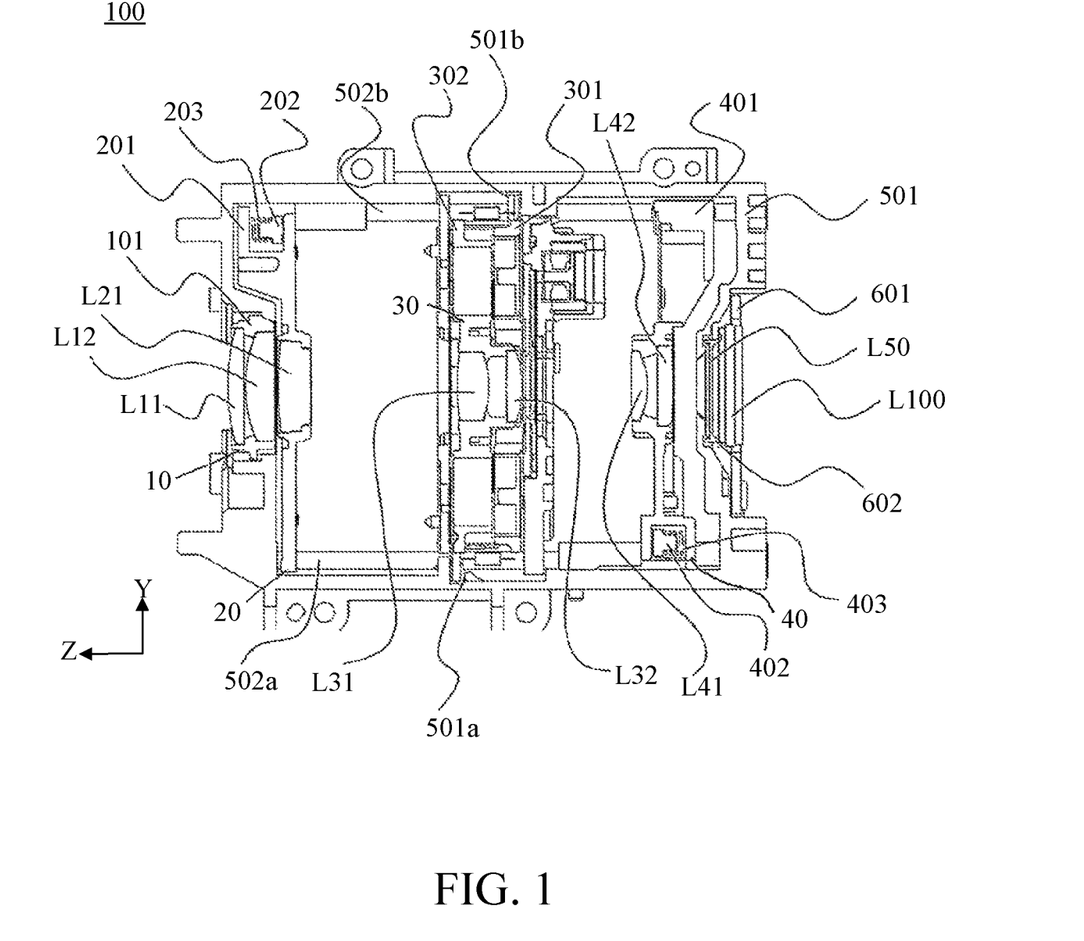
FIG. 1 is a sectional view of a lens barrel at a wide-angle end, which is mounted on a digital camera as an example of an optical apparatus according to one embodiment of the present invention.
Figure 2:
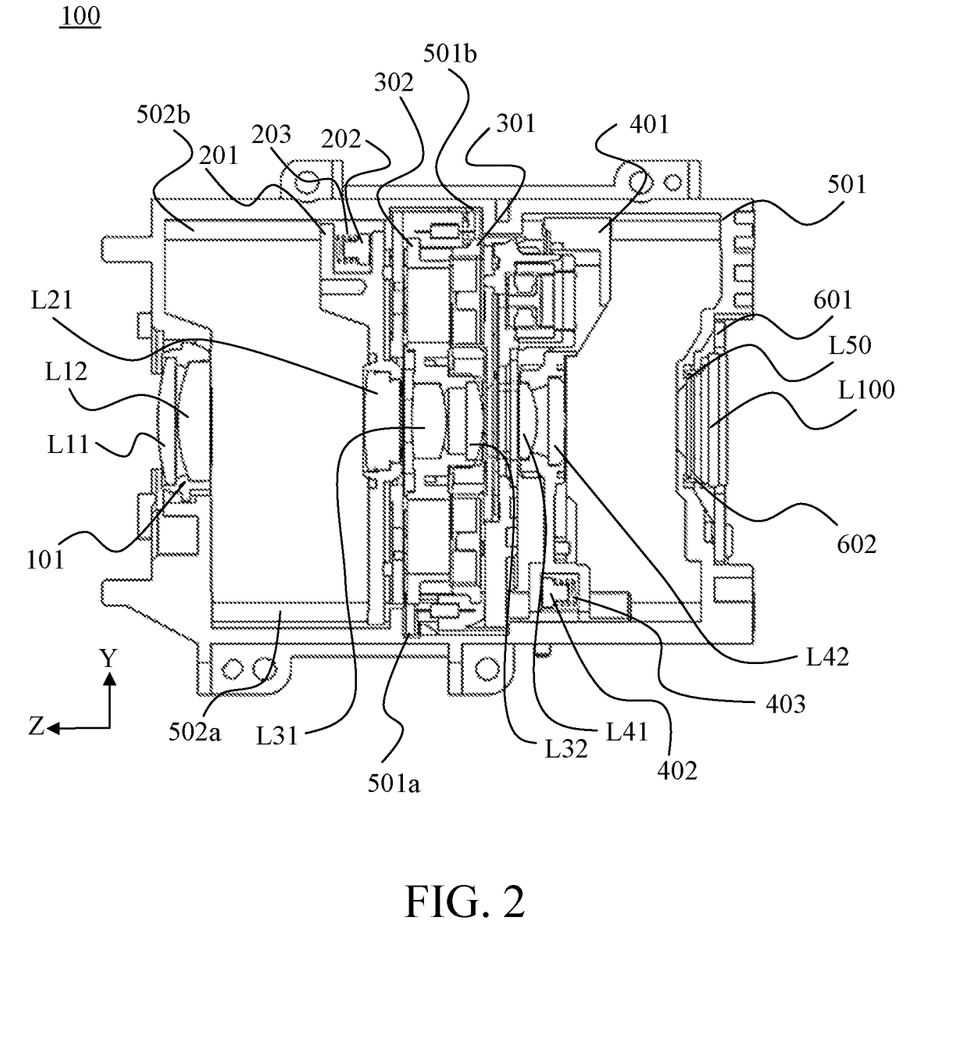
FIG. 2 is a sectional view of the lens barrel at a telephoto end.
Figure 3:
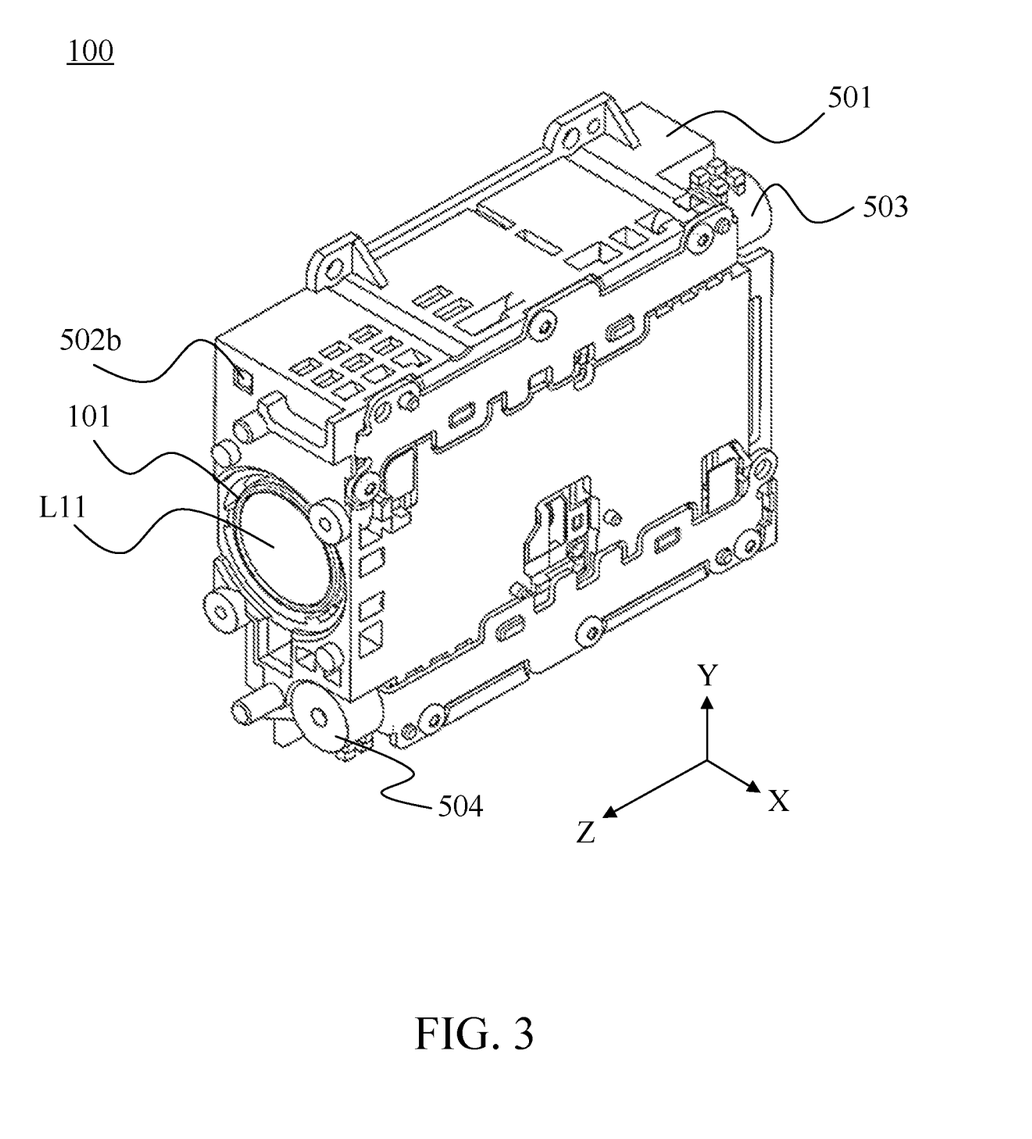
FIG. 3 is a perspective view of the lens barrel.
Figure 4:
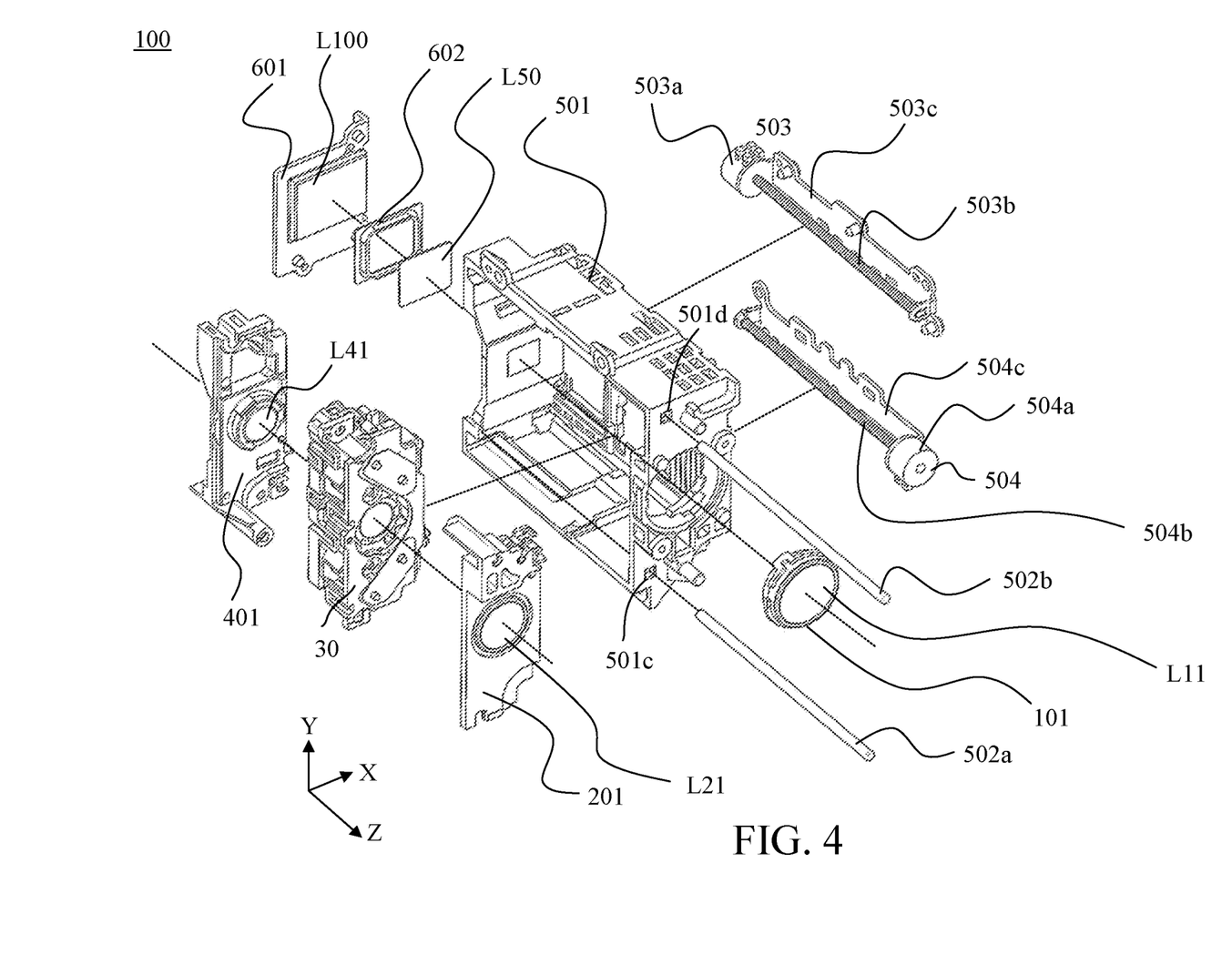
FIG. 4 is an exploded perspective view of the lens barrel.

FIG. 1 is a sectional view of a lens barrel 100 at a wide-angle end mounted on a digital camera as an example of an optical apparatus according to an embodiment of the present invention. FIG. 2 is a sectional view of the lens barrel 100 at a telephoto end. FIG. 3 is a perspective view of the lens barrel 100. FIG. 4 is an exploded perspective view of the lens barrel 100. The lens barrel 100 may be mounted on another optical apparatus, such as a monocular and a pair of binoculars.

The lens barrel 100 includes a first-group unit (first unit) 10, a second-group unit (second unit) 20, a third-group unit (third unit, correction unit) 30, and a fourth-group unit (fourth unit) 40, in this embodiment, the lens barrel 100 has an approximately rectangular outer shape.

The first-group unit 10 includes first-group lenses L11 and L12, and a first-group lens holding frame 101 that holds the first-group lenses L11 and L12. The first-group unit 10 is a fixed unit.

The second-group unit 20 includes a second-group lens (first optical element) L21 and a second-group lens holding frame (first holding member) 201 that holds the second-group lens L21. The second-group unit 20 is a magnification varying lens unit (zoom unit) and moves in the optical axis direction (Z-axis direction).

The third-group unit 30 includes third-group lenses (image stabilizing lenses, correction elements) L31 and L32, a third-group lens holding frame (third holding member) 302 that holds the third lenses L31 and L32, and a third base (base member) 301. The third-group unit 30 is a fixed unit in which the third-group base 301 is partially engaged with grooves 501a and 502b formed in a barrel box 501, and its movement is restricted in the optical axis direction. The third-group unit 30 has an image stabilizing mechanism, and corrects a camera shake during imaging when the third-group lens holding frame 302 is moved in a direction orthogonal to the optical axis (X-axis direction and Y-axis direction) during imaging.

The fourth-group unit 40 includes fourth-group lenses L41 and L42a, and a fourth-group lens holding frame (second holding member) 401 that holds the fourth-group lenses (second optical element) L41 and L42. The fourth-group unit 40 is a focus lens unit for focusing on the object.

The first-group lens holding frame 101 to the fourth-group lens holding frame 401 are housed in the barrel box 501. The first-group lens holding frame 101 is held in the barrel box 501 by an unillustrated adhesive. A second-group lens holding frame 201 to the fourth-group lens holding frame 401 are supported by guide shafts 502a and 502b.

The guide shaft (second guide shaft) 502a and the guide shaft (first guide shaft) 502b are held at both ends by the barrel box 501 and thereby fixed. The guide shaft 502a positions the fourth-group lens holding frame 401 and suppresses rotations of the second-group lens holding frame 201 and the third-group unit 30. The guide shaft 502b positions the second-group lens holding frame 201 and the third-group unit 30 and suppresses a rotation of the fourth-group lens holding frame 401. The guide shafts 502a and 502b guide movements of the second-group lens holding frame 201 and the fourth-group lens holding frame 401 in the optical axis direction.

The motor (first driving member) 503 and the motor (second driving member) 504 have approximately similar shapes and are fixed to the barrel box 501 with screws. In this embodiment, a stepping motor is used as an example of motors 503 and 504. The motor 503 (504) includes a motor body 503a (504a), an output shaft 503b (504b), and a guide plate 503c (504c) for suppressing a fall (tilt) of the output shaft 503b (504b). The output shaft 503b (504b) has a thread portion that is screwed with a rack member 202 (402) that is attached to the second-group lens holding frame 201 (fourth-group lens holding frame 401). The motors 503 and 504 drive the second-group lens holding frame 201 and the fourth-group lens holding frame 401 in the optical axis direction via the rack members 202 and 402, respectively.

An image sensor L100 for imaging an object is attached to an end of the barrel box 501 on the side of the fourth-group unit 40. The image sensor L100 is adhered and fixed to a sensor plate 601 with an unillustrated adhesive. A sensor rubber 602 and a glass filter L50 are arranged between the sensor plate 601 and the barrel box 501. The sensor rubber 602 is fixed to the barrel box 501 with screws and seals up between the image sensor L100 and the glass filter L50 in order to prevent an intrusion of external dust.

Details of Second-Group Unit

Figure 5A:
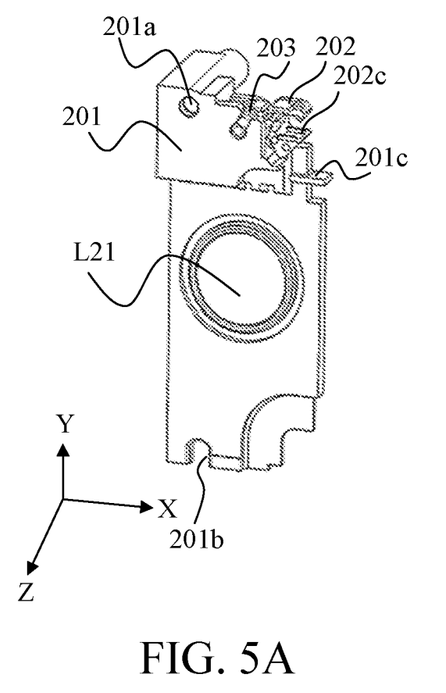
FIGS. 5A, 5B, and 5C explain a second-group unit.
Figure 5B:
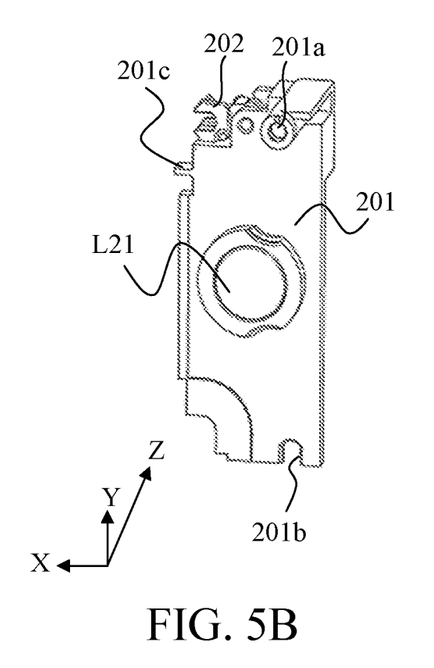
Figure 5C:
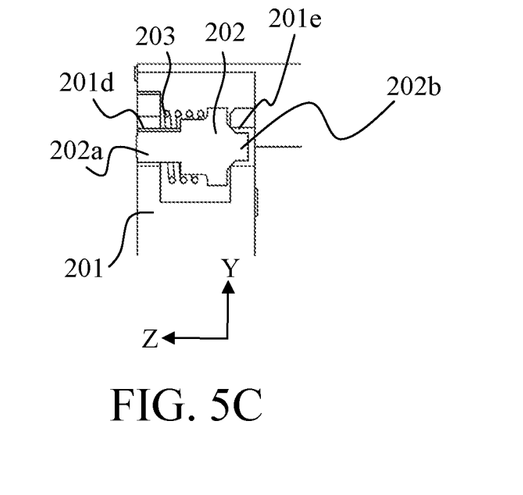

FIGS. 5A and 5B explain the second-group unit 20. FIGS. 5A and 5B are perspective views of the second-group unit 20 viewed from the object side and the image sensor L100 side, respectively. FIG. 5C is a sectional view illustrating a relationship among the second-group lens holding frame 201, the rack member 202, and an urging spring 203.

The second-group unit 20 performs a magnification variation by moving in the optical axis direction. The second-group unit 20 includes the second-group lens L21, the second-group lens holding frame 201 that holds the second-group lens L21, the rack member 202 screwed with the output shaft 503b of the motor 503, and the urging spring 203 attached to the rack member 202.

The second-group lens holding frame 201 has a hole portion 201a, an elongated hole portion 201b, and a protrusion portion 201c. The hole portion 201a pivotally supports the guide shaft 502b. The elongated hole portion 201b contacts the guide shaft 502a and thereby restrains the second-group lens holding frame 201 from rotating. The protrusion portion 201c is used to detect the position of the second-group unit 20. More specifically, when the protrusion portion 201c passes through a slit portion (not shown) in a photo-interrupter as a position detecting sensor attached to the barrel box 501, the position of the second-group unit 20 can be detected.

The rack member 202 has a shaft portion (first engagement portion) 202a, a shaft portion 202b, and a screwed portion (first screwed portion) 202c. The second-group lens holding frame 201 has hole portions 201d and 201e. The hole portions 201d and 201e pivotally support shaft portions 202a and 202b, respectively, so that the second-group lens holding frame 201 holds the rack member 202.

The urging spring 203 urges the second-group lens holding frame 201 and the rack member 202 in the optical axis direction. Thereby, the rack member 202 is moved (biased) in the direction opposite to the Z-axis direction (negative direction of the Z-axis) and a smooth movement between the components can be acquired. The urging spring 203 provides an urge such that the screwed portion 202c always contacts the output shaft 503b. Therefore, when the rack member 202 is moved in the optical axis direction by the rotation of the output shaft 503b, the second-group lens holding frame 201 can be moved integrally with the rack member 202 in the optical axis direction smoothly (without rattling).

Since the rack member 202 is rotatable attached to the second-group lens holding frame 201, it can be screwed with the output shaft 503b without being distorted relative to the engagement portions of the hole portion 201a and the guide shaft 502b.

Entire Third-Group Unit

The third-group unit 30 includes an image stabilizing mechanism and a shutter mechanism and is fixed to the barrel box 501 in a state where the movement of the third-group unit 30 in the optical axis direction is restricted.

Figure 6:
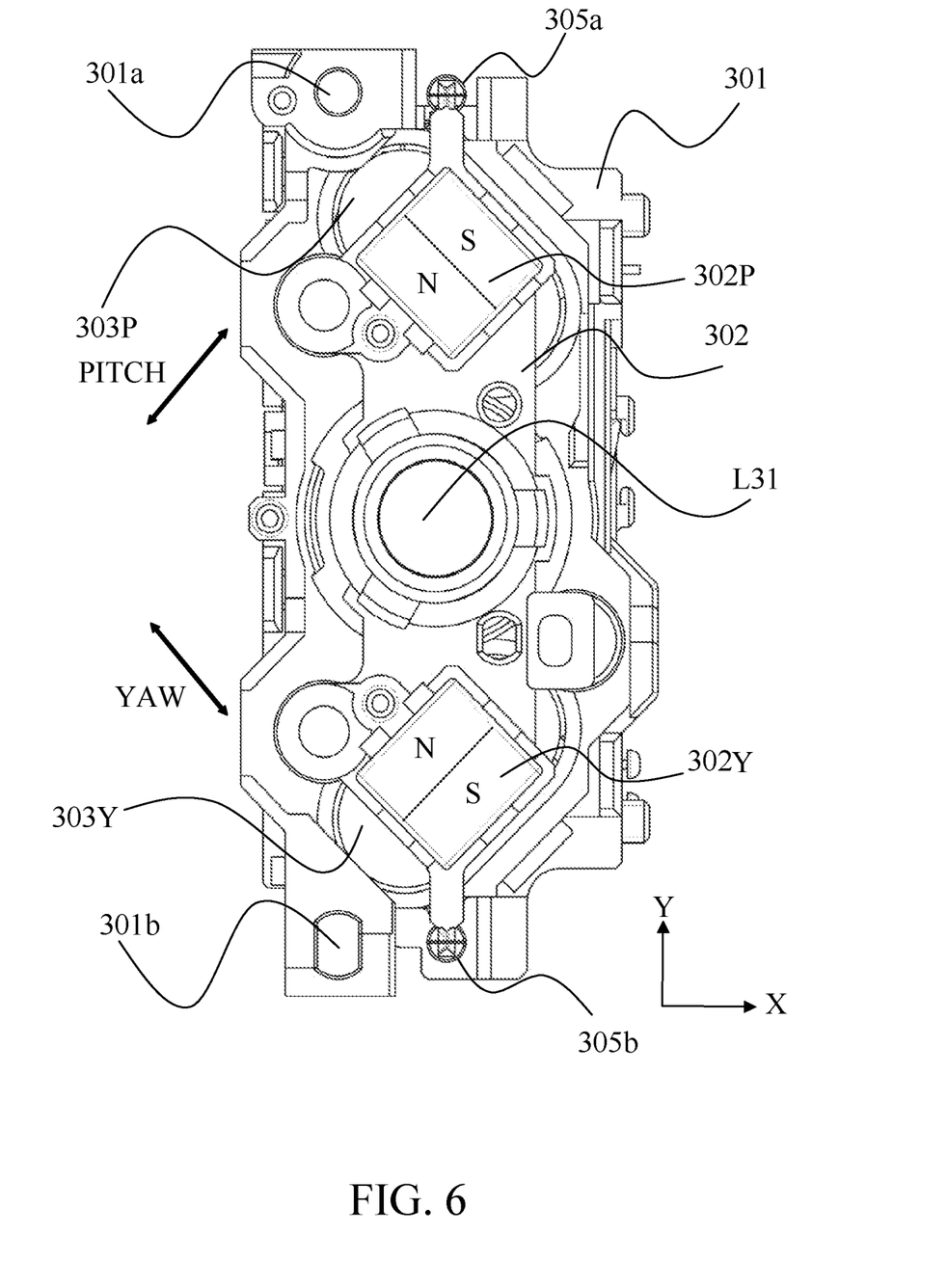
FIG. 6 is a front view of a third-group unit.
Figure 7:
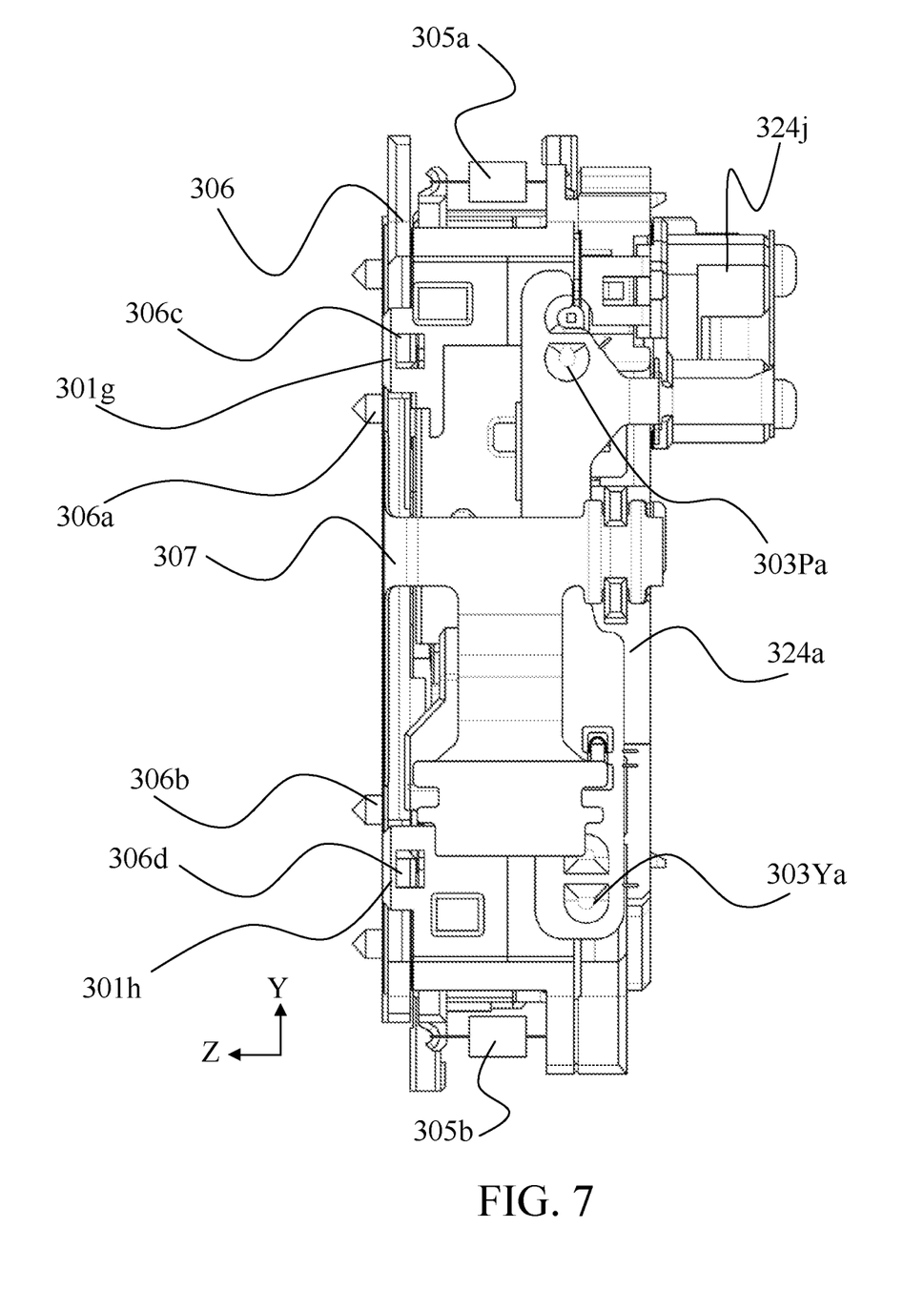
FIG. 7 is a side view of the third-group unit.
Figure 8:
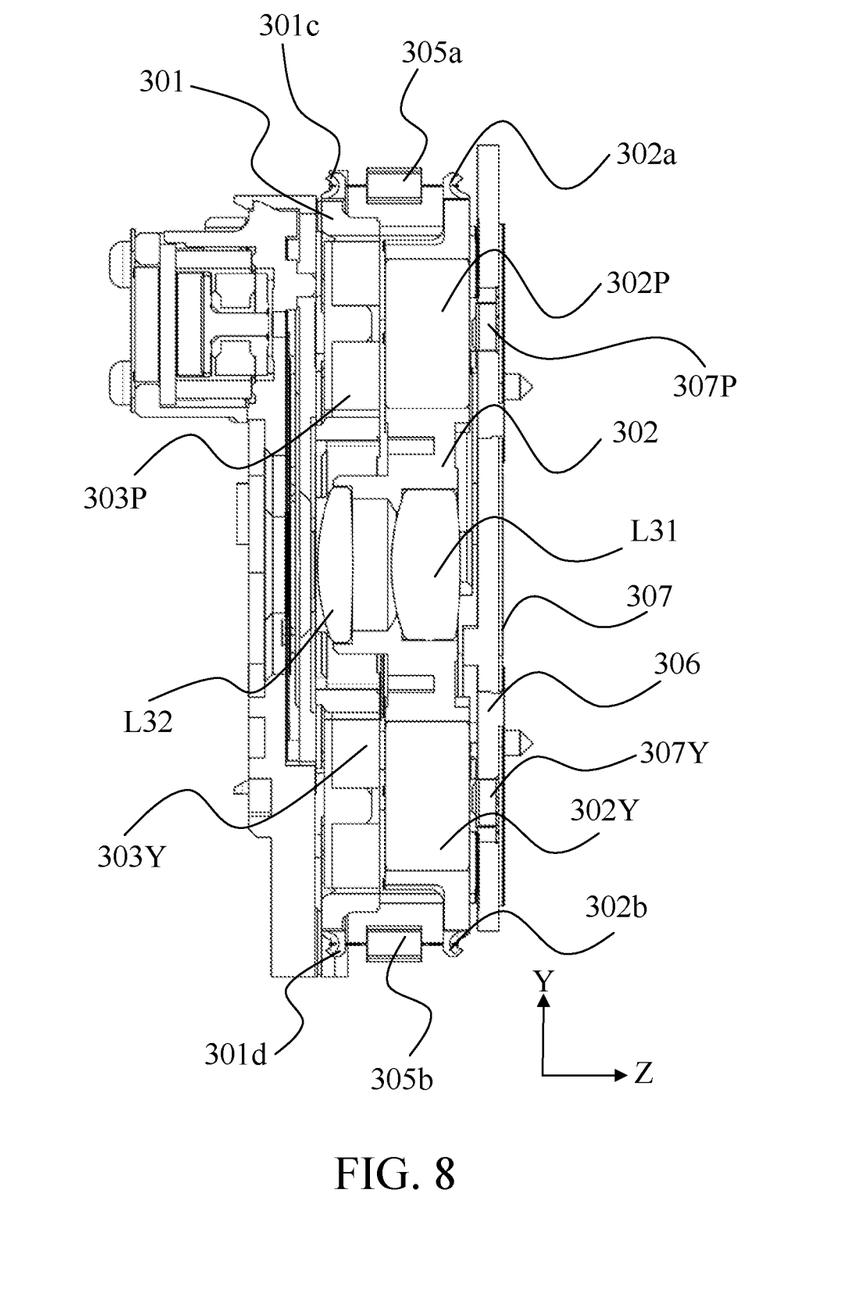
FIG. 8 is a sectional view of the third-group unit.
Figure 9:
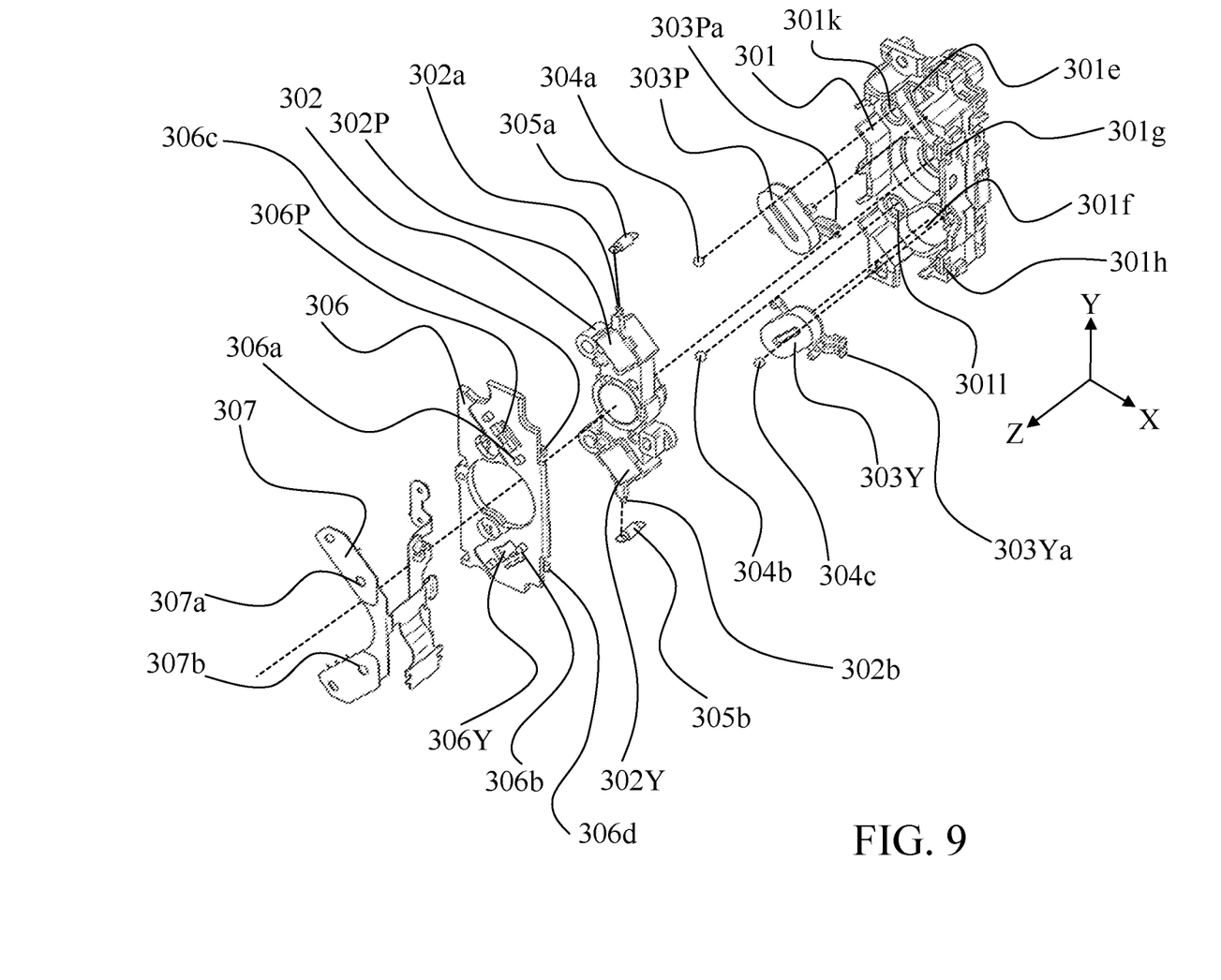
FIG. 9 is an exploded perspective view of an image stabilizing mechanism in the third-group unit.
Figure 10:
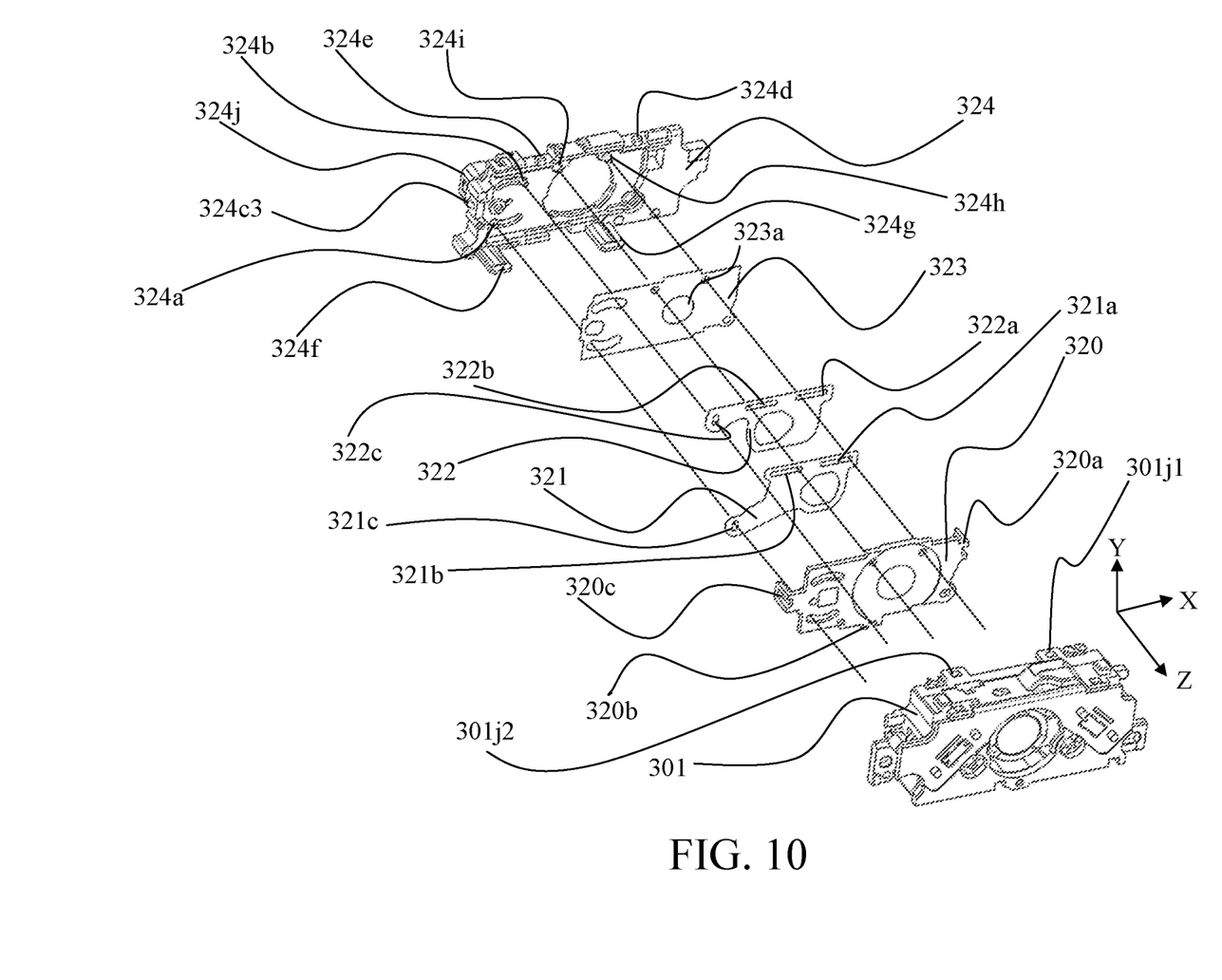
FIG. 10 is an exploded perspective view of a shutter mechanism in the third-group unit.

FIG. 6 is a front view of the third-group unit 30. FIG. 6 omits a sensor holder 306, and illustrates a positional relationship among the third-group lens holding frame 302, third-group springs 305a and 305b, and coil units 303P and 303Y. FIG. 7 is a side view of the third-group unit 30. FIG. 8 is a sectional view of the third-group unit 30 taken along the YZ plane that passes the center of the lens and viewed from the X-axis direction. FIG. 9 is an exploded perspective view of the image stabilizing mechanism. FIG. 10 is an exploded perspective view of the shutter mechanism.

The third-group base 301 has a hole portion 301a that pivotally supports the guide shaft 502b, and an elongated hole portion 301b that contacts the guide shaft 502a and suppresses the rotation of the third-group unit 30.

Details of Third-Group Image Stabilization (IS)

The third-group lens holding frame 302 includes magnets 302P and 302Y. The subscripts P and Y correspond to a pitch direction and a yaw direction in FIG. 6, respectively. The pitch direction and the yaw direction are orthogonal to each other, and have a phase difference of 45° relative to the X-axis and the Y-axis in this embodiment. Hook engagement portions 302a and 302b are provided to the third-group lens holding frame 302.

The third-group spring (first urging member) 305a and the third-group spring (second urging member) 305b are urging members that apply tensile forces, and are hung on the hook engagement portions 302a and 302b, respectively. This embodiment uses a coil spring as an example of each of the third-group springs 305a and 305b.

Each of the coil units 303P and 303Y includes a coil and a bobbin, and the coil units 303P and 303Y are fixed to grooves 301e and 301f of the third-group base 301 so as to face the magnets 302P and 302Y with an unillustrated adhesive. Metal pins 303Pa and 303Ya are embedded in the bobbins of the coil units 303P and 303Y, respectively, and are electrically connected to the coil units 303P and 303Y. A third-group FPC board 307 energizes the metal pins 303Pa and 303Ya. Thereby, the third-group lens holding frame 302 is driven. That is, by turning on and off the electrification to the coil unit 303P, the third-group lens holding frame 302 is driven in the P direction by an electromagnetic driving force generated in the magnet 302P and the coil unit 303P. Similarly, by turning on and off the electrification to the coil unit 303Y, the third-group lens holding frame 302 is driven in the Y direction by an electromagnetic driving force generated in the magnet 302Y and the coil unit 303Y.

A first end of the third-group spring 305a is hooked on the hook engagement portion 302a, and a second end is hooked on a hook engagement portion 301c provided on the third-group base 301. A first end of the third-group spring 305b is hung on the hook engagement portion 302b, and a second end is hung on the hook engagement portion 301d provided on the third-group base 301. Nonmagnetic balls 304a, 340b, and 304c are arranged in grooves 301k, 301l, and 301m in the third-group base 301 between the third-group base 301 and the third-group lens holding frame 302. The third-group lens holding frame 302 is in a state of being pressed toward the third-group base 301 via the balls 304a to 304c by the urging forces of the third-group springs 305a and 305b. That is, the balls 304a to 304c are sandwiched by the third-group base 301 and the third-group lens holding frame 302 by the urging forces of the third-group springs 305a and 305b. Since the third-group lens holding frame 302 is supported by the third-group base 301 via the balls 304a to 304c, the third-group lens holding frame 302 can be freely moved in a plane perpendicular to the optical axis direction. This embodiment moves the third-group lens holding frame 302 relative to the third-group base 301 in a plane perpendicular to the optical axis direction, and thereby provides or improves the image stabilization on the image sensor L100.

The third-group FPC 307 is connected to a shutter actuator 324j by soldering. The third-group FPC 307 is connected to the coil units 303P and 303Y by soldering. Hall elements 307P and 307Y are mounted on the back surface of the third-group FPC 307 so as to face the coil units 303P and 303Y. The magnets 302P and 302Y are magnetized to an S pole and an N pole. The Hall elements 307P and 307Y detect changes in the magnetic fields of the magnets 302P and 302Y due to the movement of the third-group lens holding frame 302 in the pitch direction and the yaw direction, respectively. A moving amount of the third-group lens holding frame 302 is calculated based on the detected changing amount. Positional accuracies of the magnets 302P and 302Y and the Hall elements 307P and 307Y are important. In this embodiment, the Hall elements 307P and 307Y are accurately positioned and fixed by being press-fitted into Hall element insertion portions 306P and 306Y of the sensor holder 306, respectively.

The third-group FPC 307 is fixed to the sensor holder 306 when positioning holes 307a and 307b formed in the third-group FPC 307 are engaged with positioning shafts 306a and 306b formed on the sensor holder 306. When engagement portions 306c, 306d, and 306e (not shown) provided on the sensor holder 306 are engaged with engagement portions 301g, 301h, and 301i (not shown) provided to the third-group base 301, the sensor holder 306 is fixed to the third-group base 301.

Details of Third-Group Shutter

The shutter mechanism is disposed on a side of the fourth-group unit 40 of the image stabilizing mechanism via the third-group base 301. The shutter mechanism includes a shutter cover 320, shutter blades 321 and 322, a shutter sheet 323, and a shutter base plate 324. The shutter blades 321 and 322 and the shutter sheet 323 are arranged between the shutter cover 320 and the shutter base plate 324.

The shutter cover 320 is provided with engagement portions 320a, 320b, and 320c. The shutter cover 320 is fixed to the shutter base plate 324 when the engagement portions 320a to 320c are engaged with engagement portions 324c1 (not shown), 324c2 (not shown), 324c3 (not shown) formed on the shutter base plate 324, respectively.

The shutter base plate 324 is provided with engagement portions 324d, 324e, 324f, and 324g. The shutter base plate 324 is fixed to the third-group base 301 when the engagement portions 324d to 324g are engaged with engagement portions 301j1, 301j2, 301j3 (not shown), and 301j4 (not shown) provided on the third-group base 301, respectively.

The shutter base plate 324 is provided with guide shafts 324h and 324i. The guide shaft 324h is inserted into elongated holes 321a and 322a formed in the shutter blades 321 and 322, respectively. The guide shaft 324i is inserted into elongated holes 321b and 322b formed in the shutter blades 321 and 322, respectively.

The shutter actuator 324j is attached to the shutter base plate 324 and drives the shutter blades 321 and 322. A drive arm is fixed to a rotation shaft of the shutter actuator 324j. Drive shafts 324a and 324b are formed at the tip of the drive arm. The drive shaft 324a is inserted into an elongated hole 321c formed in the shutter blade 321. The drive shaft 324b is inserted into an elongated hole 322c formed in the shutter blade 322.

A shutter sheet 323 is provided with an opening 323a, which is a necessary port based on the optical design. The shutter blade 322 is slidable relative to the shutter sheet 323.

A description will now be given of operations of the shutter blades 321 and 322. The drive arm of the shutter actuator 324j is rotated by turning on and off the electrification to the shutter actuator 324j. At this time, due to the interactions between the elongated holes 321a and 321b and the guide shafts 324h and 324i and the interaction between the elongated hole 321c and the drive shaft 324a, the shutter blade 321 is translated in the first direction of the X-axis without rotating. Due to the interactions between the elongated holes 322a and 322b and the guide shafts 324h and 324*i* and the interaction between the elongated holes 322*c* and the drive shaft 324*b*, the shutter blade 322 is translated in the second direction opposite to the first direction of the X-axis without rotating. In this way, the shutter function is realized by changing the aperture formed by the shutter blades 321 and 321 from an open state to a closed state. B changing an electrification direction to the shutter actuator 324*j*, the aperture formed by the shutter blades 321 and 322 can be changed from the closed state to the open state.

Details of Fourth-Group Unit

Figure 11A:
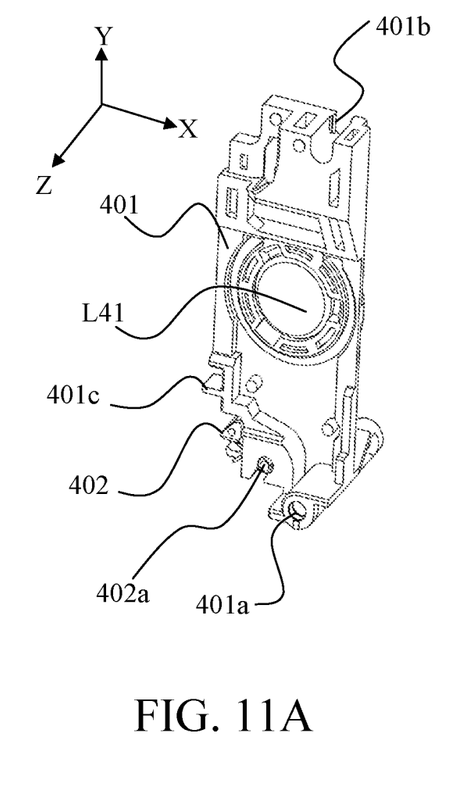
FIGS. 11A, 11B, and 11C explain a fourth-group unit.
Figure 11B:
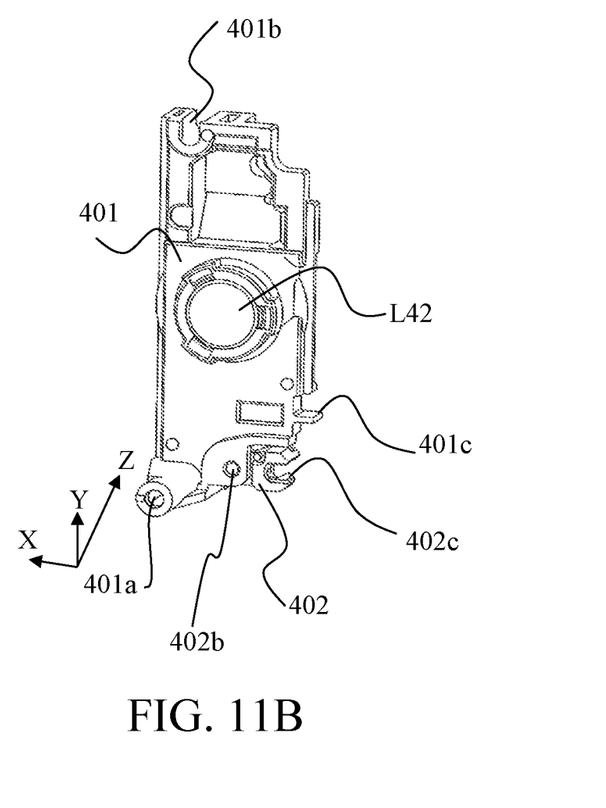
Figure 11C:
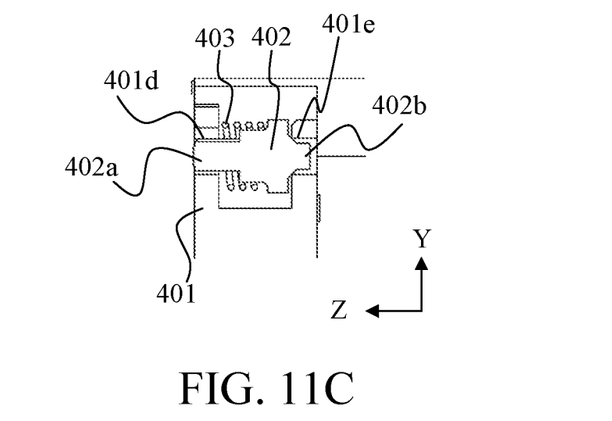

FIGS. 11A to 11C explain the fourth-group unit 40. FIGS. 11A and 11B are perspective views of the fourth-group unit 40 viewed from the object side and the image sensor L100 side, respectively. FIG. 11C is a sectional view illustrating a relationship among the fourth-group lens holding frame 401, the rack member 402, and an urging spring 403.

The fourth-group unit 40 functions of focusing on the object by moving in the optical axis direction. The fourth-group unit 40 includes the fourth-group lenses L41 and L42, the fourth-group lens holding frame 401 for holding the fourth-group lenses L41 and L42, the rack member 402 screwed with the output shaft 504*b* of the motor 504, and the urging spring 403 attached to the rack member 402.

The fourth-group lens holding frame 401 has a hole portion 401*a*, an elongated hole portion 401*b*, and a protrusion portion 401*c*, The hole portion 401*a* pivotally supports the guide shaft 502*a*. The elongated hole portion 401*b* contacts the guide shaft 502*b* and thereby restrains the fourth-group lens holding frame 401 from rotating. The protrusion portion 401*c* is used to detect the position of the fourth-group unit 40. More specifically, when the protrusion portion 401*c* passes through a slit portion (not shown) in a photo-interrupter as a position detecting sensor attached to the barrel box 501, the position of the fourth-group unit 40 can be detected.

The rack member 402 has a shaft portion (second engagement portion) 402*a*, a shaft portion 402*b*, and a screwed portion (second screwed portion) 402*c*. The fourth-group lens holding frame 401 has hole portions 401*d* and 401*e*. The hole portions 401*d* and 401*e* pivotally support the shaft portions 402*a* and 402*b*, respectively, so that the fourth-group lens holding frame 401 holds the rack member 402.

The urging spring 403 urges the fourth-group lens holding frame 401 and the rack member 402 in the optical axis direction. Thereby, the rack member 402 is moved (biased) in the direction opposite to the Z-axis direction and can eliminate the unsteadiness between the components can be eliminated. The urging spring 403 provides an urge such that the screwed portion 402*c* always contacts the output shaft 504*b*. Therefore, when the rack member 402 is moved in the optical axis direction by the rotation of the output shaft 504*b*, the fourth-group lens holding frame 401 can be moved integrally with the rack member 402 in the optical axis direction smoothly (without rattling).

Since the rack member 402 is rotatably attached to the fourth-group lens holding frame 401, it can be engaged with the output shaft 504*b* without being distorted relative to the engagement portion between the hole portion 401*a* and the guide shaft 502*a*.

Arrangement of Respective Components

Figure 12A:
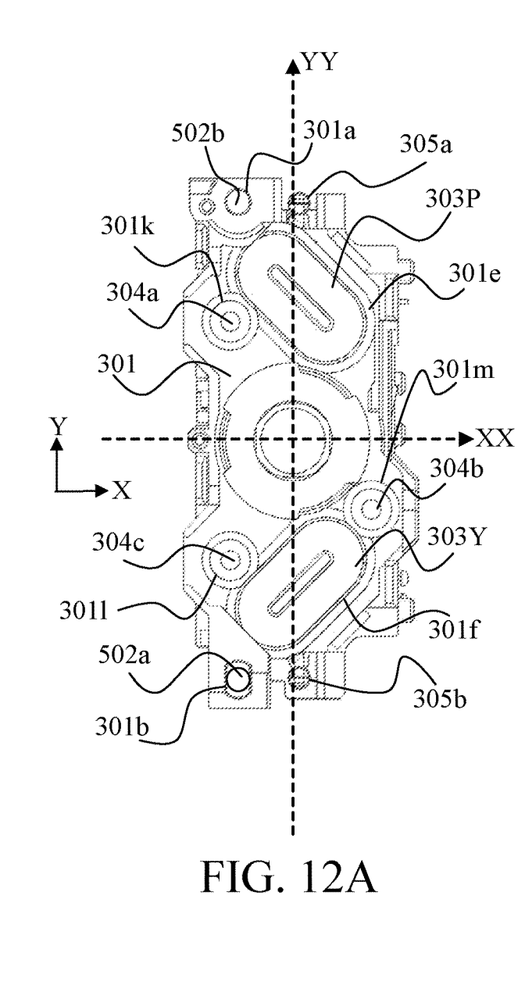
FIGS. 12A, 12B, and 12C explain an arrangement of respective components.
Figure 12B:
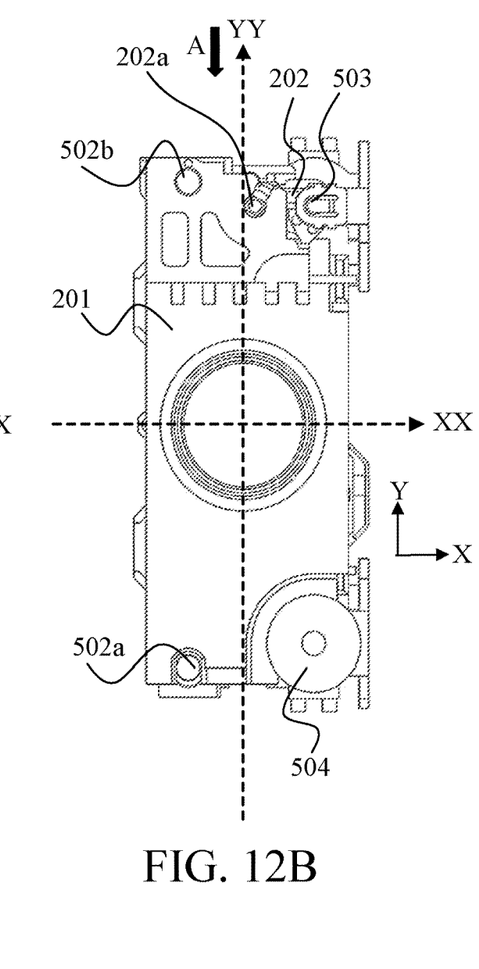
Figure 12C:
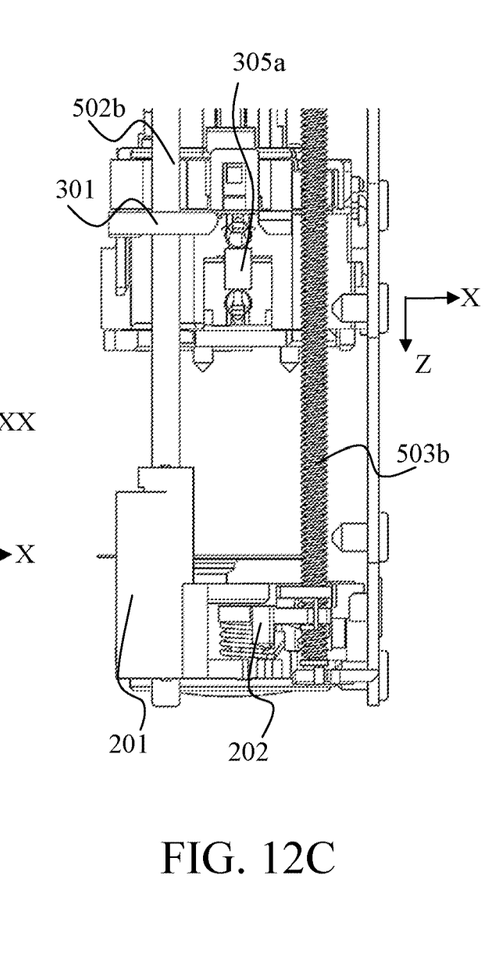

Referring now to FIGS. 12A, 12B, and 12C, a description will be given of an arrangement of respective components for realizing the miniaturization of the lens barrel 100. In particular, a description will be given of the arrangement of the motors 503 and 504, guide shafts 502*a* and 502*b* c, rack members 202 and 402, magnets 302P and 302Y, coil units 303P and 303Y, and third-group springs 305*a* and 305*b*.

FIGS. 12A, 12B, and 12C explain the arrangement of the respective components. FIG. 12A illustrates a positional relationship among the coil units 303P and 303Y the third-group springs 305*a* and 305*b*, and the guide shafts 502*a* and 502*b*. FIG. 12B illustrates a positional relationship among the motors 503 and 504, the guide shafts 502*a* and 502*b*, and the rack members 202 and 402. FIG. 12C is a view of FIG. 12B viewed from the arrow A side. As illustrated in FIGS. 12A and 12B, axes that pass through the optical axis and are orthogonal to the optical axis are defined as an XX axis and a YY axis.

The coil units 303P and 303Y are arranged as close as possible to the YY axis in a case where the lens barrel 100 is viewed from the front. The coil units 303P and 303Y are arranged in the groove portions 301*e* and 301*f* in the third-group base 301 approximately line-symmetrically with respect to the XX axis in order to stabilize the drive controllability of the third-group lens holding frame 302. Along with the arrangement of the coil units 303P and 303Y the magnets 302P and 302Y are also arranged close to the YY axis and approximately line-symmetrically with respect to the XX axis. Therefore, the center of gravity of the third-group lens holding frame 302 is located near the YY axis. The balls 304*a* to 304*c* are arranged in the groove portions 301*k* to 301*m* of the third-group base 301 based on the balance of the center of gravity and the miniaturization of the third-group lens holding frame 302. In addition, based on the balance of the center of gravity of the third-group lens holding frame 302, it is necessary to arrange the third-group springs 305*a* and 305*b* near the YY axis. In this embodiment, the third-group springs 305*a* and 305*b* are arranged near the YY axis on the outer shape sides of the coil units 303P and 303Y in the YY axis direction. The third-group springs 305*a* and 305*b* are arranged approximately line-symmetrically with respect to the XX axis similarly to the coil units 303P and 303Y.

In this embodiment, the size of the third-group base 301 in the XX axis direction is determined by the arrangement of the coil units 303P and 303Y and the balls 304*a* to 304*c* and the moving amount of the third-group lens holding frame 302 in the XX axis direction. The size of the third-group base 301 in the YY axis direction is determined by the arrangement of the coil units 303P and 303Y and the third-group springs 305*a* and 305*b* and the moving amount of the third-group lens holding frame 302 in the YY axis direction.

As illustrated in FIG. 12A, the guide shafts 502*a* and 502*b* are disposed on the left sides of the third-group springs 305*a* and 305*b*, on the outer sides of the coil units 303P and 303Y in the YY axis direction, and near the longitudinal directions of the coil units 303P and 303Y. The guide shafts 502*a* and 502*b* are arranged approximately line-symmetrically with respect to the XX axis. The guide shafts 502*a* and 502*b* are arranged on the optical axis side (right side of FIG. 12A) of the groove portions 301*k* and 301*l* in the XX axis direction.

As illustrated in FIG. 12C, the output shaft 503*b* of the motor 503 extends in the optical axis direction and passes through each group unit. Since the output shaft 503*b* needs to be disposed at such a position that it does not interfere with (does not overlap) the third-group spring 305*a* when viewed from the optical axis direction, it is disposed so as to face the long side of the coil unit 303P on the right sides illustrated in FIGS. 12A and 12B of the third-group spring 305*a*. Since the position facing the long side of the coil unit 303P has more space than the position facing the short side, the motor 503 can be disposed (biased) closer to the XX axis direction. Thereby, the motor body 503*a* having a diameter larger than that of the output shaft 503b can be disposed without greatly protruding from the outer shapes of the second-group lens holding frame 201 and the third-group base 301.

In order to reduce the size of the lens barrel, it is necessary to arrange respective components as close to the XX axis and YY axis as possible. However, in the retractable lens barrel, respective lens units are very close to each other in the non-imaging state, so it is difficult to arrange the respective components at positions that overlap the lens holding frame in the optical axis direction without interfering with the lens holding frame. In particular, since the rack member has a thickness in the optical axis direction, it is necessary to dispose it outside the lens holding frame in the retractable lens barrel. In addition, it is also necessary to dispose the motor body including the output shaft with which the rack member is screwed, outside the lens holding frame. The lens barrel becomes large in the XX axis direction and the YY axis direction.

In this embodiment, the lens barrel 100 is not a retractable type, the third-group unit 30 as the fixed unit is disposed between the second-group unit 20 and the fourth-group unit 40 as the movable units, and thus there is a space for disposing the rack member 202 in the optical axis direction. Therefore, as illustrated in FIG. 12B, the rack member 202 can be disposed between the guide shaft 502b and the motor 503. Since the rack member 202 has a thickness in the optical axis direction but does not interfere with the third-group spring 305a as illustrated in FIG. 12C, the rack member 202 can be located at a position overlapping the third-group spring 305a in the optical axis direction. That is, the rack member 202 is contained within the outer shapes of the second-group lens holding frame 201 and the third-group base 301 when viewed from the optical axis direction, and is located at approximately the same position as that of each of the guide shafts 502a and 502b in the optical axis direction. Thereby, the lens barrel 100 can be made smaller.

As described above, in this embodiment, when viewed from the optical axis direction, the motor 503, the guide shaft 502b, the rack member 202, and the third-group spring 305a are arranged on a straight line parallel to the XX axis, which is the axis of symmetry of the coil units 303P and 303Y. At this time, the shaft portion 202a and the screwed portion 202c are also arranged on a line parallel to the XX axis. Thereby, a projected area of the lens barrel 100 viewed from the optical axis direction can be reduced. That is, the lens barrel 100 can be made smaller. The rack member 202 is disposed between the motor 503 and the guide shaft 502b disposed along the XX axis direction. Thereby, the rack member 202 can be housed in the outer shape of the third-group base 301 determined by the arrangement of the coil units 303P and 303Y and the balls 304a to 304c and the moving amount of the third-group lens holding frame 302. That is, the lens barrel can be made smaller.

In this embodiment, the arrangement of the motor 504, the guide shaft 502a, the rack member 402, the coil unit 303Y, and the third-group spring 305b is similar, and thus a detailed description thereof will be omitted.

The lens barrel 200 can be made smaller by similarly arranging the rack member 402, the guide shaft 502a, the motor 504, and the third-group spring 305b.

This embodiment arranges two guide shafts on the left side and two motors on the right side via the rack member and the third-group spring, but may arrange two guide shafts on the right side and two motors on the left side.

The guide shafts 502a and 502b and the motors 503 and 504 may be arranged so as to be approximately point-symmetrical with respect to the optical axis.

As long as the guide shafts 502a and 502b, the motors 503 and 504, the rack members 202 and 402, and the third-group springs 305a and 305b are arranged along the XX axis, the order of these components is not limited to this example. For example, the third-group springs 305a and 305b may be arranged at positions of the guide shafts 502a and 502b and the motors 503 and 504.

Assembly Order

A description will be given of the procedure of assembling the lens barrel 100. First, as illustrated in FIG. 3, the motors 503 and 504 are fixed to the barrel box 501 with screws. Next, as illustrated in FIG. 4, the second-group unit 20, the third-group unit 30, and the fourth-group unit 40 are attached to the barrel box 501 from the side opposite to the direction in which the motors 503 and 504 are attached. At this time, the second-group unit 20 is incorporated so that the rack member 202 is screwed with the output shaft 503b. Similarly, the fourth-group unit 40 is incorporated so that the rack member 402 is screwed with the output shaft 504b. The third-group unit 30 is incorporated so that part of the third-group base 301 is fitted into the groove portions 501a and 501b formed in the barrel box 501. While each unit is incorporated into the barrel box 501, the guide shafts 502a and 502b are inserted through the holes 501c and 501d formed on the side of the first-group unit 10 of the barrel box 501. The guide shaft 502a passes through the hole portions 201a, 301a, and 401a and is inserted into a hole portion (not shown) formed on the side of the fourth-group unit 40 of the barrel box 501. The guide shaft 502b passes through the elongated hole portions 201b, 301b, and 401b, and is inserted into a hole portion (not shown) formed on the side of the fourth-group unit 40 of the barrel box 501. Thereafter, the glass filter L50 is incorporated into the barrel box 501, and the sensor plate 601 to which the image sensor L100 is adhered and fixed is fixed to the barrel box 501 with screws while the sensor rubber 602 is assembled on the glass filter L50. Finally, the first-group lens holding frame 101 is assembled into the barrel box 501 and adhered and fixed to complete the assembly of the lens barrel 100.

Driving of Lens Barrel

A description will be given of an operation of the lens barrel 100 during imaging. When the power is turned on, the image sensor L100 is activated. Next, the second-group unit 20 and the fourth-group unit 40 start driving in the optical axis direction. At this time, the protrusion portion 201c of the second-group lens holding frame 201 and the protrusion portion 401c of the fourth-group lens holding frame 401 pass through the slit portions of the unillustrated photo-interrupters attached to the barrel box 501. Thereby, it is detected that the second-group unit 20 and the fourth-group unit 40 have passed the initial position. Thereafter, the second-group unit 20 and the fourth-group unit 40 are moved to the wide-angle end of FIG. 1.

When the photographer performs a zoom operation to the telephoto side, the second-group unit 20, which is a zoom group, starts driving. More specifically, when the output shaft 503b is rotationally driven by the motor 503, the second-group unit 20 is moved toward the third-group unit 30 along the optical axis due to an engagement relationship between the rack member 202 and the output shaft 503b. The fourth-group unit 40 also starts driving so as to follow the second-group unit 20. More specifically, when the output shaft 504b is rotationally driven by the motor 504, the fourth-group unit 40 is moved toward the third-group unit 30 along the optical axis due to the engagement relationship between the rack member 402 and the output shaft 504*b*. Since the focus tracking operation is performed in accordance with the operation of the second-group unit 20, an object image can be acquired that does not give a sense of discomfort even when the lens barrel 100 is moved from the wide-angle end to the telephoto end.

When the photographer performs the zoom operation to the wide-angle end, the second-group unit 20 starts driving and is moved to the first-group unit 10. At this time, the fourth-group unit 40 is moved to the side of the image sensor L100, and the focus tracking operation is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens barrel comprising:
    a first rack member configured to movably support a first holding member in an optical axis direction, the first holding member holding a first optical element;
    a first driving member configured to drive the first holding member via the first rack member;
    a second rack member configured to movably support a second holding member in the optical axis direction, the second holding member holding a second optical element;
    a second driving member configured to drive the second holding member via the second rack member;
    a first guide shaft and a second guide shaft configured to guide movements of the first holding member and the second holding member in the optical axis direction, respectively; and
    a correction unit that includes:
        a first coil unit configured to drive a third holding member in a first direction orthogonal to the optical axis direction, the third holding member holding a correction element,
        a second coil unit configured to drive the first holding member in a second direction orthogonal to the optical axis direction and the first direction, and
        a first urging member and a second urging member configured to urge the third holding member in the optical axis direction,
    wherein the first rack member, the first driving member, the first guide shaft, and the first urging member are arranged on a first straight line parallel to an axis of symmetry of the first and second coil units when viewed from the optical axis direction, and
    wherein the second rack member, the second driving member, the second guide shaft, and the second urging member are arranged on a second straight line parallel to the axis of symmetry when viewed from the optical axis direction.

2. The lens barrel according to claim 1, wherein the first rack member includes a first engagement portion engaged with the first holding member, and a first screwed portion screwed with an output shaft of the first driving member,
    wherein the second rack member includes a second engagement portion engaged with the second holding member, and a second screwed portion screwed with an output shaft of the second driving member, and
    wherein the first engagement portion and the first screwed portion are arranged on a third straight line parallel to the axis of symmetry when viewed from the optical axis direction, and
    wherein the second engagement portion and the second screwed portion are arranged on a fourth straight line parallel to the axis of symmetry when viewed from the optical axis direction.

3. The lens barrel according to claim 1, wherein the first urging member and the first rack member are arranged between the first driving member and the first guide shaft when viewed from the optical axis direction, and
    wherein the second urging member and the second rack member are arranged between the second driving member and the second guide shaft when viewed from the optical axis direction.

4. The lens barrel according to claim 1, wherein the first and second driving members are arranged along a direction orthogonal to the axis of symmetry and the optical axis direction, and
    wherein the first and second guide shafts are arranged along a direction orthogonal to the axis of symmetry and the optical axis direction.

5. The lens barrel according to claim 1, wherein the first driving member is disposed opposite to a long side of the first coil unit when viewed from the optical axis direction, and
    wherein the second driving member is disposed opposite to a long side of the second coil unit when viewed from the optical axis direction.

6. The lens barrel according to claim 1, wherein the correction unit further includes a base member configured to hold the first and second coil units, and
    wherein the first and second rack members, the first and second driving members, and the first and second guide shafts are housed within an outer shape of the base member when viewed from the optical axis direction.

7. The lens barrel according to claim 1, wherein the first holding member is positioned by the first guide shaft in the optical axis direction, and restrained from rotating by the second guide shaft, and
    wherein the second holding member is positioned by the second guide shaft in the optical axis direction, and restrained from rotating by the first guide shaft.

8. The lens barrel according to claim 1, wherein the third holding member is disposed between the first holding member and the second holding member in the optical axis direction.

9. The lens barrel according to claim 1, wherein the correction unit is a fixed unit whose movement in the optical axis direction is restricted.

10. An optical apparatus comprising a lens barrel,
    wherein the lens barrel includes:
    a first rack member configured to movably support a first holding member in an optical axis direction, the first holding member holding a first optical element;
    a first driving member configured to drive the first holding member via the first rack member;
    a second rack member configured to movably support a second holding member in the optical axis direction, the second holding member holding a second optical element;
    a second driving member configured to drive the second holding member via the second rack member;

a first guide shaft and a second guide shaft configured to guide movements of the first holding member and the second holding member in the optical axis direction, respectively; and a correction unit that includes:
- a first coil unit configured to drive a third holding member in a first direction orthogonal to the optical axis direction, the third holding member holding a correction element,
- a second coil unit configured to drive the first holding member in a second direction orthogonal to the optical axis direction and the first direction, and
- a first urging member and a second urging member configured to urge the third holding member in the optical axis direction, wherein the first rack member, the first driving member, the first guide shaft, and the first urging member are arranged on a first straight line parallel to an axis of symmetry of the first and second coil units when viewed from the optical axis direction, and wherein the second rack member, the second driving member, the second guide shaft, and the second urging member are arranged on a second straight line parallel to the axis of symmetry when viewed from the optical axis direction.

* * * * *